US012726586B2

(12) United States Patent
Kale et al.

(10) Patent No.: US 12,726,586 B2
(45) Date of Patent: Sep. 1, 2026

(54) REMOVABLE STORAGE DEVICE WITH A VIRTUAL CAMERA FOR VIDEO SURVEILLANCE AS A SERVICE

(71) Applicant: Lodestar Licensing Group LLC, Evanston, IL (US)

(72) Inventors: Poorna Kale, Folsom, CA (US); Te-Chang Lin, New Taipei City (TW)

( * ) Notice: Subject to any disclaimer, the term of this patent is extended or adjusted under 35 U.S.C. 154(b) by 0 days.

(21) Appl. No.: 17/869,634

(22) Filed: Jul. 20, 2022

(65) Prior Publication Data

US 2022/0368851 A1 Nov. 17, 2022

Related U.S. Application Data

(63) Continuation of application No. 17/002,707, filed on Aug. 25, 2020, now Pat. No. 11,405,579.

(51) Int. Cl.

| | |
|---|---|
| ***G06F 21/79*** | (2013.01) |
| ***G06F 21/60*** | (2013.01) |
| ***G06V 20/52*** | (2022.01) |
| ***H04N 5/765*** | (2006.01) |
| ***H04N 5/907*** | (2006.01) |
| ***H04N 5/91*** | (2006.01) |
| ***H04N 7/18*** | (2006.01) |

(Continued)

(52) U.S. Cl.

CPC ........... *H04N 5/765* (2013.01); *G06F 21/602* (2013.01); *G06V 20/52* (2022.01); *H04N 5/907* (2013.01); *H04N 5/91* (2013.01); *H04N 7/183* (2013.01); *H04L 67/10* (2013.01)

(58) Field of Classification Search

CPC ........ G06F 21/602; G06F 21/79; G06F 21/83; G06V 10/95; G06V 20/52; G08B 13/196; H04L 65/1063; H04L 65/61; H04L 65/765; H04L 67/10; H04N 5/765; H04N 5/77; H04N 5/907; H04N 5/91; H04N 7/183

USPC .................................. 348/42, 47, 50, 61, 73

See application file for complete search history.

(56) References Cited

U.S. PATENT DOCUMENTS 9,473,758 B1 * 10/2016 Long .................... H04N 13/275
10,754,893 B1 * 8/2020 Isler ...................... G06F 16/787

(Continued)

FOREIGN PATENT DOCUMENTS

CN 106534808 A 3/2017
KR 101095951 12/2011

OTHER PUBLICATIONS

International Search Report and Written Opinion, PCT/US2021/046721, mailed on Nov. 29, 2021.

(Continued)

*Primary Examiner* — Daquan Zhao

(57) ABSTRACT

Systems, devices, and methods related to video surveillance as a service (VSaaS) are described. For example, a removable storage device, such as a secure digital (SD) memory card or a micro SD card, can be configured to run a virtual camera agent. When the removable storage device is inserted into a digital camera to provide a storage capacity for the digital camera, the agent can convert the video captured by the digital camera into video captured by a virtual camera. The virtual camera can be configured to be in compliance with the camera requirements of a VSaaS platform. Thus, a digital camera not in compliance with the platform can still be used with the platform through the deployment of the virtual camera that is enabled by the removable storage device.

16 Claims, 6 Drawing Sheets

(51) Int. Cl.
*G06F 21/83* (2013.01)
*H04L 67/10* (2022.01)

(56) References Cited

U.S. PATENT DOCUMENTS 11,405,579 B2 8/2022 Kale et al.
2001/0017655 A1 8/2001 Arakt
2004/0004737 A1 1/2004 Kahn et al.
2006/0287080 A1* 12/2006 Bychkov ................. A63F 13/95 463/29
2009/0031381 A1* 1/2009 Cohen ................... H04L 67/125 725/115
2010/0067870 A1 3/2010 Yamaguchi et al.
2011/0304706 A1* 12/2011 Border ................. H04N 13/172 348/E13.074
2013/0014187 A1* 1/2013 Huang .................. G06F 9/3867 725/93
2013/0183025 A1 7/2013 Yamaguchi et al.
2014/0267752 A1 9/2014 Huang
2016/0088326 A1 3/2016 Solomon et al.
2017/0257414 A1* 9/2017 Zaletel .................. H04L 65/764
2017/0374261 A1 12/2017 Teich et al.
2018/0288485 A1 10/2018 Sugio et al.
2019/0268625 A1 8/2019 Jeon et al.
2020/0037001 A1* 1/2020 Nielsen ................ H04N 19/107
2021/0320967 A1* 10/2021 Kale ...................... G06N 3/063
2021/0333863 A1* 10/2021 Chen .................... G06V 40/172
2022/0070407 A1 3/2022 Kale et al.

OTHER PUBLICATIONS

Chang-qing, W., et al., “Scheme of Embedded Data Transmission based on Ethernet Frame and Its Implementation”, Computer Engineering and Design, vol. 32, No. 6, Jun. 16, 2011, pp. 1-5.

Chinese patent office, “China Office Action,” issued in connection with China Patent Application No. 202180051383.3 dated Apr. 24, 2026 (17 pages) (8 pages of English Translation and 9 pages of Original Document).

* cited by examiner

REMOVABLE STORAGE DEVICE WITH A VIRTUAL CAMERA FOR VIDEO SURVEILLANCE AS A SERVICE

RELATED APPLICATIONS

The present application is a continuation application of U.S. patent application Ser. No. 17/002,707 filed Aug. 25, 2020, the entire disclosures of which application are hereby incorporated herein by reference.

TECHNICAL FIELD

At least some embodiments disclosed herein relate to memory systems in general, and more particularly, but not limited to memory systems configured with agents for video surveillance as a service (VSaaS).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Video surveillance as a service (VSaaS) provides cloud-based services of video recording, storage, remote viewing, management alerts, cyber security, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
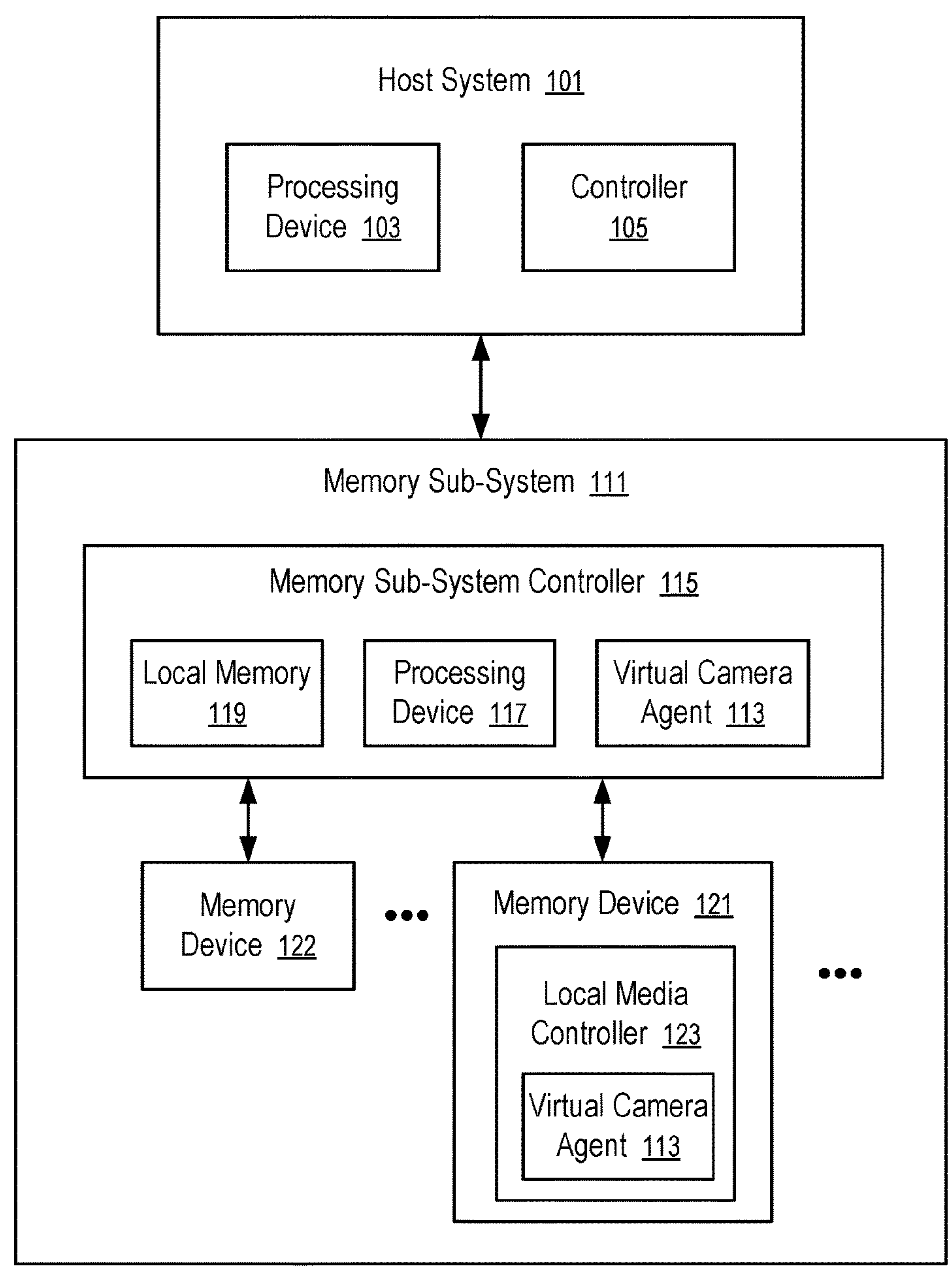
FIG. 1 illustrates an example computing system that includes a memory sub-system in accordance with some embodiments of the present disclosure.

At least some aspects of the present disclosure are directed to a memory sub-system configured with an agent implementing a virtual camera for video surveillance as a service (VSaaS). Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Video surveillance as a service (VSaaS) can be implemented using a cloud platform, or a server computer system, that communicates with digital cameras at the locations of surveillance to obtain video inputs. Different VSaaS platforms may have different camera requirements. It is inefficient to require the physical replacement of the digital cameras when the camera requirements of VSaaS are changed.

At least some aspects of the present disclosure address the above and other deficiencies by configuring a VSaaS agent in a removable storage device, such as a secure digital (SD) memory card, or a micro SD card. The VSaaS agent can be implemented via software, or instructions, executed in the storage device and/or in the host device of the storage device, such as a digital camera. After the removable storage device is inserted into a digital camera, the VSaaS agent runs in the removable storage device to implement a virtual camera to capture video using the hardware capability of the digital camera that hosts the removable storage device. The virtual camera can be configured according to the camera requirements of the VSaaS platform and updated without physical replacing the digital camera.

For example, when such a removable storage device is inserted into a third party camera, the VSaaS agent running on the removable storage device converts the third party camera into a camera that is in compliance with the requirements of the VSaaS platform. Thus, a third party camera can be used with the VSaaS platform.

For example, a digital camera initially installed for one VSaaS platform can be dynamically reconfigured via the removable storage device to run a virtual camera usable with an alternative VSaaS platform that may have different camera requirements.

For example, when a VSaaS platform provides a software development kit (SDK) for integrate 3rd party cameras into the cloud platform, an adapter can be provided to adapt or reconfigure the virtual camera to meet the requirements of the cloud VSaaS platform and thus enable various cameras to be used on the cloud platform.

Optionally, the VSaaS agent can be configured to provide edge storage for a VSaaS platform using the removable storage device and/or provide edge server functionality for video surveillance.

Optionally, the removable storage device can include security/cryptographic keys to enable authentication and secure communication between the VSaaS platform and the virtual camera and to protect video data from unauthorized access.

Optionally, the VSaaS agent can be configured in the digital camera without the use of a removable storage device.

Optionally, the VSaaS agent running in a digital camera is configured to automatically probe the hardware capabilities of the camera and thus determine a configuration file to map the physical camera into a virtual camera comparable with the camera requirements of a cloud VSaaS platform.

Optionally, a centralized server can be used to provide clues to VSaaS agents. The clues can be used to probe the hardware capabilities of their host cameras.

For example, an initial generic version of VSaaS agents can run in a camera to study the hardware capabilities of the camera. Subsequently, the generic VSaaS agent reconfigures, or upgrades, itself to be optimized for the operation of the camera.

For example, when the VSaaS agent is instructed to work with a particular cloud VSaaS platform, the VSaaS agent can communicate with the centralized server to update itself for compliance with the requirements of the cloud VSaaS platform.

FIG. 1 illustrates an example computing system that includes a memory sub-system (111) in accordance with some embodiments of the present disclosure. The memory sub-system (111) can include media, such as one or more volatile memory devices (e.g., memory device (122)), one or more non-volatile memory (NVM) devices (e.g., memory device (121)), or a combination of such.

The memory sub-system (111) can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system of FIG. 1 can be a computing device such as a desktop computer, a laptop computer, a network server, a mobile device, a vehicle (e.g., airplane, drone, train, automobile, or other conveyance), an internet of things (IoT) enabled device, a surveillance camera, an embedded computer (e.g., one included in a vehicle, industrial equipment, or a networked commercial device), or such a computing device that includes memory and a processing device.

The computing system of FIG. 1 can include a host system (101) that is coupled to one or more memory sub-systems (111). FIG. 1 illustrates one example of a host system (101) coupled to one memory sub-system (111). As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system (101) can include a processor chipset (e.g., processing device (103)) and a software stack executed by the processor chipset. The processor chipset can include one or more cores, one or more caches, a memory controller (e.g., controller (105)) (e.g., NVDIMM controller), and a storage protocol controller (e.g., PCIe controller, SATA controller). The host system (101) uses the memory sub-system (111), for example, to write data to the memory sub-system (111) and read data from the memory sub-system (111).

The host system (101) can be coupled to the memory sub-system (111) via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, or any other interface. The physical host interface can be used to transmit data between the host system (101) and the memory sub-system (111). The host system (101) can further utilize an NVM express (NVMe) interface to access components (e.g., memory devices (121)) when the memory sub-system (111) is coupled with the host system (101) by the PCIe interface. The physical host interface can provide an interface for passing control, address, data, and other signals between the memory sub-system (111) and the host system (101). FIG. 1 illustrates a memory sub-system (111) as an example. In general, the host system (101) can access multiple memory sub-systems via a same communication connection, multiple separate communication connections, and/or a combination of communication connections.

The processing device (103) of the host system (101) can be, for example, a microprocessor, a central processing unit (CPU), a processing core of a processor, an execution unit, etc. In some instances, the controller (105) can be referred to as a memory controller, a memory management unit, and/or an initiator. In one example, the controller (105) controls the communications over a bus coupled between the host system (101) and the memory sub-system (111). In general, the controller (105) can send commands or requests to the memory sub-system (111) for desired access to memory devices (121, 122). The controller (105) can further include interface circuitry to communicate with the memory sub-system (111). The interface circuitry can convert responses received from memory sub-system (111) into information for the host system (101).

The controller (105) of the host system (101) can communicate with controller (115) of the memory sub-system (111) to perform operations such as reading data, writing data, or erasing data at the memory devices (121, 122) and other such operations. In some instances, the controller (105) is integrated within the same package of the processing device (103). In other instances, the controller (105) is separate from the package of the processing device (103). The controller (105) and/or the processing device (103) can include hardware such as one or more integrated circuits (ICs) and/or discrete components, a buffer memory, a cache memory, or a combination thereof. The controller (105) and/or the processing device (103) can be a microcontroller, special purpose logic circuitry (e.g., a field programmable gate array (FPGA), an application specific integrated circuit (ASIC), etc.), or another suitable processor.

The memory devices (121, 122) can include any combination of the different types of non-volatile memory components and/or volatile memory components. The volatile memory devices (e.g., memory device (122)) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices (121) can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices (121) can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices (121) can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device (121) can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (or, NOT OR) (NOR) flash memory, and electrically erasable programmable read-only memory (EEPROM).

A memory sub-system controller (115) (or controller (115) for simplicity) can communicate with the memory devices (121) to perform operations such as reading data, writing data, or erasing data at the memory devices (121) and other such operations (e.g., in response to commands scheduled on a command bus by controller (105)). The controller (115) can include hardware such as one or more integrated circuits (ICs) and/or discrete components, a buffer memory, or a combination thereof. The hardware can include digital circuitry with dedicated (i.e., hard-coded) logic to perform the operations described herein. The controller (115) can be a microcontroller, special purpose logic circuitry (e.g., a field programmable gate array (FPGA), an application specific integrated circuit (ASIC), etc.), or another suitable processor.

The controller (115) can include a processing device (117) (e.g., processor) configured to execute instructions stored in a local memory (119). In the illustrated example, the local memory (119) of the controller (115) includes an embedded memory configured to store instructions for performing various processes, operations, logic flows, and routines that control operation of the memory sub-system (111), including handling communications between the memory sub-system (111) and the host system (101).

In some embodiments, the local memory (119) can include memory registers storing memory pointers, fetched data, etc. The local memory (119) can also include read-only memory (ROM) for storing micro-code. While the example memory sub-system (111) in FIG. 1 has been illustrated as including the controller (115), in another embodiment of the present disclosure, a memory sub-system (111) does not include a controller (115), and can instead rely upon external control (e.g., provided by an external host, or by a processor or controller separate from the memory sub-system).

In general, the controller (115) can receive commands or operations from the host system (101) and can convert the commands or operations into instructions or appropriate commands to achieve the desired access to the memory devices (121). The controller (115) can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices (121). The controller (115) can further include host interface circuitry to communicate with the host system (101) via the physical host interface. The host interface circuitry can convert the commands received from the host system into command instructions to access the memory devices (121) as well as convert responses associated with the memory devices (121) into information for the host system (101).

The memory sub-system (111) can also include additional circuitry or components that are not illustrated. In some embodiments, the memory sub-system (111) can include a cache or buffer (e.g., DRAM) and address circuitry (e.g., a row decoder and a column decoder) that can receive an address from the controller (115) and decode the address to access the memory devices (121).

In some embodiments, the memory devices (121) include local media controllers (123) that operate in conjunction with memory sub-system controller (115) to execute operations on one or more memory cells of the memory devices (121). An external controller (e.g., memory sub-system controller (115)) can externally manage the memory device (121) (e.g., perform media management operations on the memory device (121)). In some embodiments, a memory device (121) is a managed memory device, which is a raw memory device combined with a local controller (e.g., local media controller (123)) for media management within the same memory device package. An example of a managed memory device is a managed NAND (MNAND) device.

The controller (115) and/or a memory device (121) can include a virtual camera agent (113) configured to implement a virtual camera for a video surveillance as a service (VSaaS) platform. In some embodiments, the controller (115) in the memory sub-system (111) and/or the local media controller (123) includes at least a portion of the virtual camera agent (113). In other embodiments, or in combination, the controller (105) and/or the processing device (103) in the host system (101) includes at least a portion of the virtual camera agent (113). For example, the controller (115) in the memory sub-system (111), the controller (105) in the host system (101), and/or the processing device (103) of the host system (101) can include logic circuitry implementing the virtual camera agent (113). For example, the controller (115) or the processing device (103) (e.g., processor) of the host system (101), can be configured to execute instructions stored in memory for performing the operations of the virtual camera agent (113) described herein. In some embodiments, the virtual camera agent (113) is implemented in an integrated circuit chip disposed in the memory sub-system (111). In other embodiments, the virtual camera agent (113) can be part of firmware of the memory sub-system (111), an operating system of the host system (101), a device driver, or an application, or any combination therein.

For example, the virtual camera agent (113) implemented in the computer system of FIG. 1 can provide a virtual camera using video data stored into the memory sub-system (111). Various aspects of the virtual camera can be adjusted, changed, and/or customized without changing the hardware of the computing system of FIG. 1. Thus, the virtual camera can be used by a video surveillance as a service (VSaaS) platform to obtain video input according to the camera requirements of the platform. When the camera requirements change as a result of switching from one VSaaS platform to another, or when there is a mismatch between the hardware video capability and the camera requirements of a platform, the virtual camera can be adapted to meet the camera requirements without changing the hardware.

Figure 2:
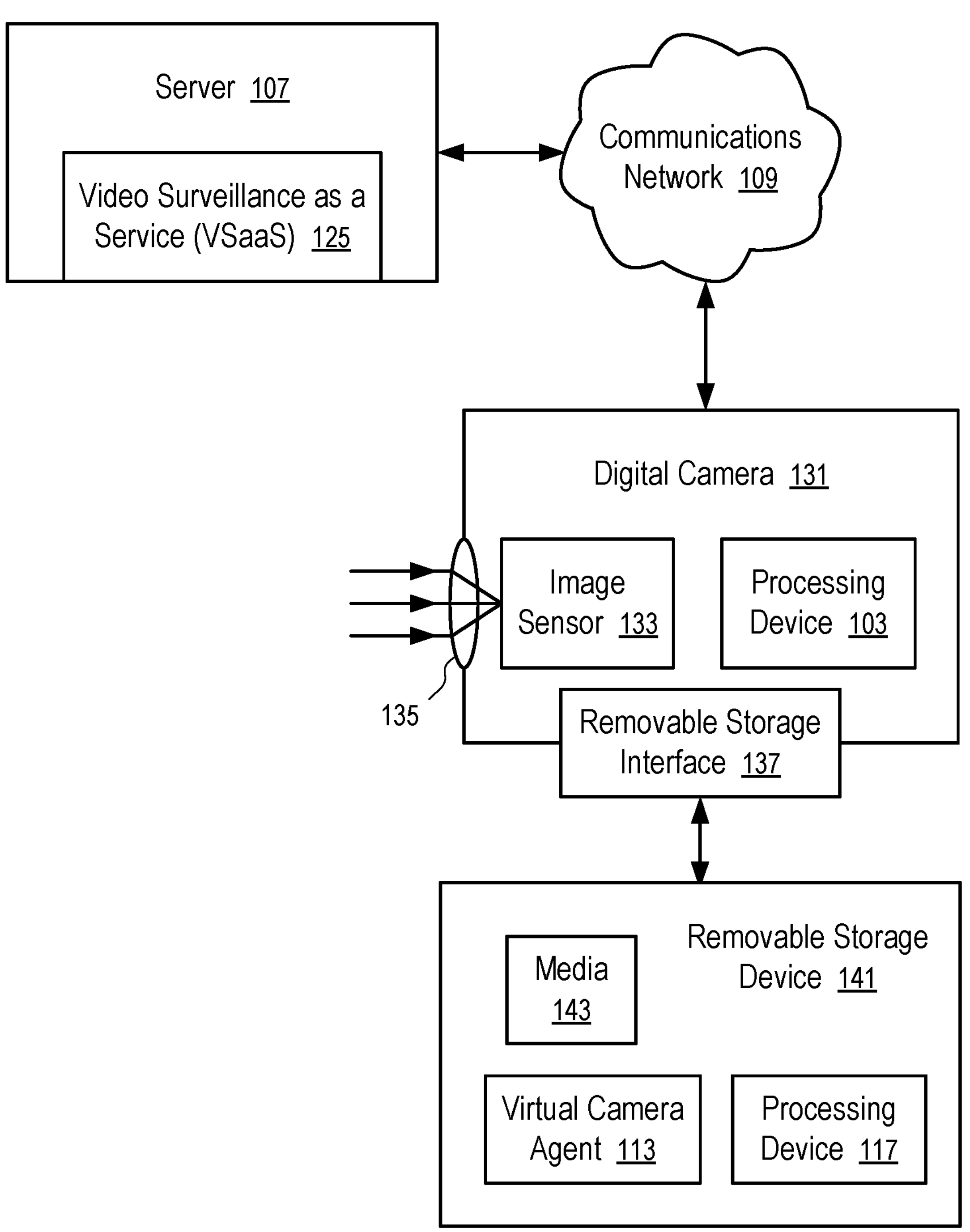
FIG. 2 shows the use of a virtual camera agent with a video surveillance as a service (VSaaS) platform according to one embodiment.

FIG. 2 shows the use of a virtual camera agent with a video surveillance as a service (VSaaS) platform according to one embodiment.

In FIG. 2, a server (107) is connected to a digital camera (131) via a communications network (109). The communications network (109) can include a wired or wireless computer network and/or the internet.

The server (107) obtains video data from the digital camera (131) to provide video surveillance as a service (VSaaS) (125). For example, the server (107) can store the video data for the digital camera (131). For example, the server (107) can provide the video data for viewing by an authorized user over the communications network (109) and/or another computer network. For example, the server (107) can process the video data to detect anomaly and generate alerts to registered users.

In general, there is a wide spectrum of digital cameras that are capable of providing video data. However, the server (107) may have a set of camera requirements for compatibility with the VSaaS (125) provided by the server (107). Thus, some digital cameras may not have hardware capabilities required by the server (107).

For example, a digital camera (131) illustrated in FIG. 2 may not have hardware capabilities that meet the camera specification required by the VSaaS (125). To enable the digital camera (131) to work with the server (107) of the VSaaS (125), a removable storage device (141) can be connected/inserted into a removable storage interface (137) of the digital camera (131) to run a virtual camera that is compatible with the requirements of the server (107).

For example, the removable storage device (141) can be configured in the form of a secure digital (SD) memory card, a micro SD memory card, a USB flash memory drive, a solid state drive (SSD), etc.

The digital camera (131) can have an image sensor (133) that generates video data from images projected from a lens (135). The digital camera (131) can have a processing device (103) that controls the usage of the removable storage interface (137).

For example, the processing device (103) can temporally store video data into media (143) of the removable storage device (141) for retrieval by the server (107).

The removable storage device (141) includes a processing device (117) that can be used to run a virtual camera agent (113). The virtual camera agent (113) converts the video data received from the digital camera (131) into a video stream that is in compliance with the camera requirements of the server (107). Thus, when the server (107) retrieves video data from the digital camera (131), the video stream that is generated by the virtual camera agent (113) and that is in compliance with the requirement of the server (107) is communicated from the removable storage device (141) of the digital camera (131) to the server (107). The virtual camera agent (113) uses the hardware capability of the image sensor (133) to provide a virtual camera usable by the server (107).

For example, the image format, frame rate, and/or resolution, etc. of the image sensor (133) and/or the processing device (103) may not match with the camera requirements of the server (107). The virtual camera agent (113) can convert the video data for the server (107) such that the video output transmitted from the digital camera (131) to the server (107) meets the camera requirements of the server (107).

Optionally, the virtual camera agent (113) uses not only the processing power of the processing device (117) of the removable storage device (141) but also the processing power of the processing device (103) of the digital camera (131) to improve the overall performance of the digital camera (131) in servicing video inputs to the server (107).

In some embodiments, the virtual camera agent (113) is configured as instructions to be executed by the processing device (103) of the digital camera (131). When the removable storage device (141) is inserted into the removable storage interface (137), the instructions of the virtual camera agent (113) are loaded from the removable storage device (141) for execution by the processing device (103) of the digital camera (131). Alternatively, the instructions of the virtual camera agent (113) can be loaded into the digital camera (131) through a wired or wireless network connection (e.g., in the form of a firmware update). The virtual camera agent (113) running in the digital camera (131) converts the video data generated by the image sensor (133) to write the converted video stream into the media (143) of the removable storage device (141).

Alternatively, the digital camera (131) writes the video data from the image sensor (133) into an input region of the media (143); and the virtual camera agent (113) converts the video data stored in the input region into a video stream stored in an output region of the media (143). The virtual camera agent (113) can manage the file system in the media such that the video stream generated by the virtual camera agent (113) can be read/retrieved by the server (107).

Optionally, the virtual camera agent (113) uses the media (143) as edge storage. The video data is stored in the media (143) until it is requested by the server (107) and/or when the storage capacity of the media (143) is to be freed to store new video data.

Optionally, the virtual camera agent (113) can function as an edge server to process the video data for the server (107) to identify anomaly and/or features for further analysis. Thus, the virtual camera agent (113) can determine whether to transfer the video data to the server (107), and/or to discard certain portion of the video data captured by the image sensor (133). The processing of the video data by the virtual camera agent (113) can reduce the usage of the communication bandwidth over the communications network (109) and/or reduce the video data storage on the server (107) and/or in the media (143).

Since the removable storage device (141) can be easily replaced and/or upgraded, the digital camera (131) can be adapted to meet the requirements of the server (107) and/or to improve the overall performance of the VSaaS (125).

Optionally, the virtual camera agent (113) is configured to encrypt the video data using a cryptographic key of the server (107) such that unauthorized access to the video data captured by the digital camera (131) can be prevented. For example, the key of the server (107) can be a public key of the server (107); the video data is encrypted using an asymmetric encryption technique; and the server (107) uses its private key to decrypt the video data retrieved from the digital camera (131) and/or the removable storage device (141). Alternatively, the key of the server (107) used for encrypting the video data using a symmetric encryption technique is a secret key shared between the server (107) and the virtual camera agent (113); and a third party cannot decrypt the video data without the secret key.

Figure 3:
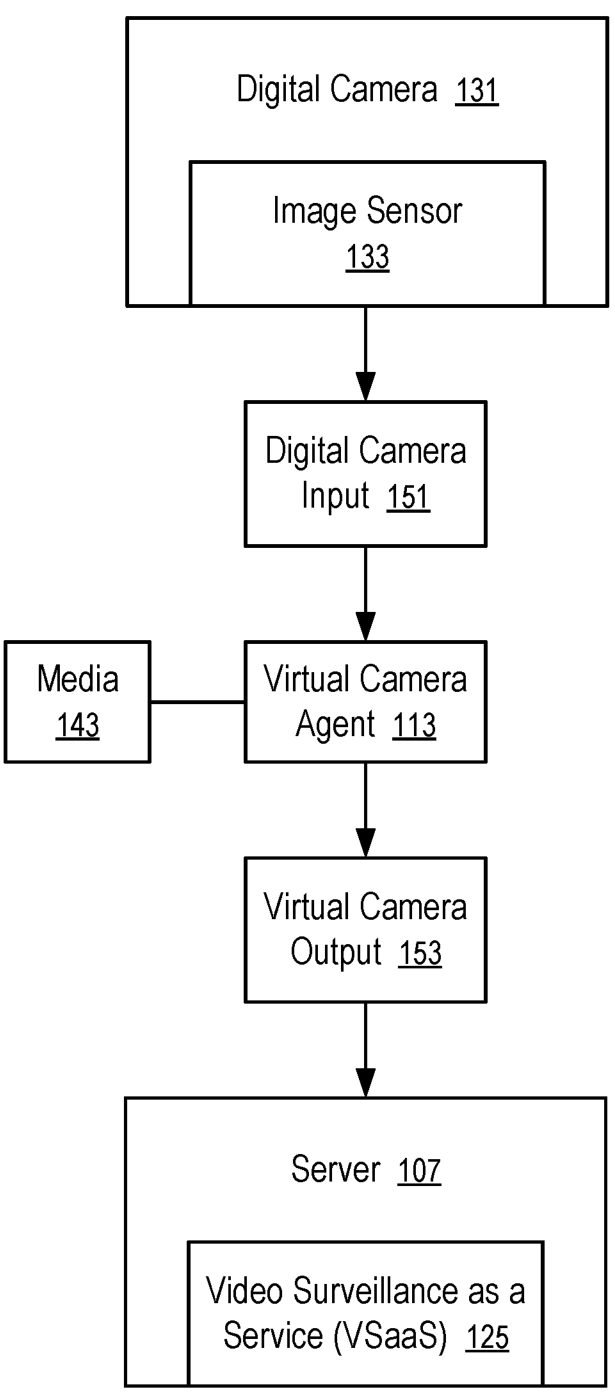
FIG. 3 illustrates the conversion from a digital camera input into a virtual camera output according to one embodiment.

FIG. 3 illustrates the conversion from a digital camera input into a virtual camera output according to one embodiment. For example, the conversion of FIG. 3 can be implemented in the removable storage device (141) of FIG. 2 or the memory sub-system (111) of FIG. 1.

In FIG. 3, the virtual camera agent (113) is configured as a gatekeeper of the media (143) of a storage device, such as the memory device (121) of FIG. 1, the memory sub-system (111) of FIG. 1, the removable storage device (141) of FIG. 2.

When the media (143) receives the digital camera input (151) from a digital camera (131), such as the video data from the image sensor (133), the virtual camera agent (113) converts the digital camera input (151) as a virtual camera output (153). Thus, the virtual camera agent (113) functions like a virtual camera that views the scene as in the digital camera input (151) and captures the virtual camera output (153) according to the hardware specification of cameras compatible to the requirements of the server (107) of VSaaS (125).

Through accessing the video data through the media (143), the server (107) accesses the video as seen through the virtual lens and image sensor of the virtual camera agent (113), instead of the lens (135) and image sensor (133) of the hardware of the digital camera (131). Since the virtual camera agent (113) can be adjusted via parameters and instructions without hardware modifications, the provisioning of the virtual camera agent (113) in a digital camera (131) and/or a removable storage device (141) allows the enhanced configurability for different VSaaS platforms and servers (e.g., 107).

Figure 4:
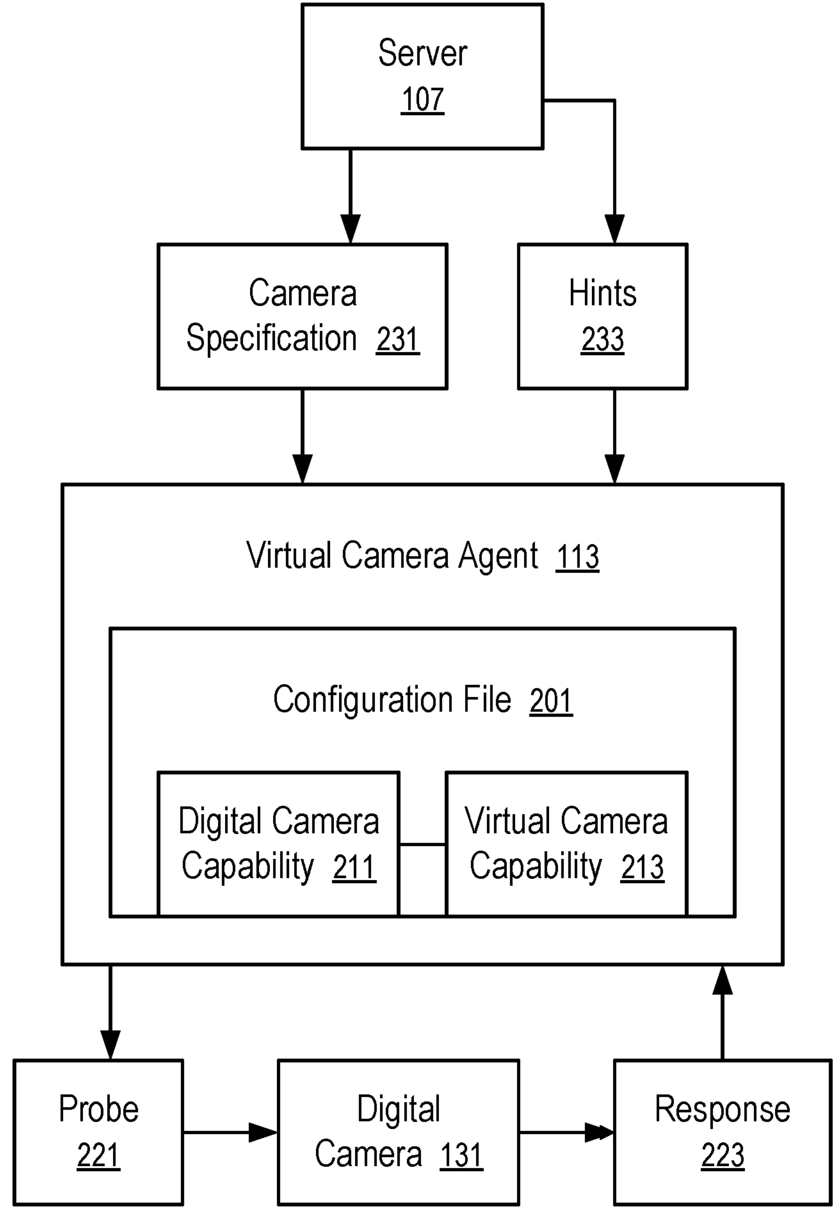
FIG. 4 shows techniques to configure a virtual camera according to one embodiment.

FIG. 4 shows techniques to configure a virtual camera according to one embodiment. For example, the techniques of FIG. 4 can be used to configure the virtual camera agents (113) illustrated in FIGS. 1 to 3.

In FIG. 4, a virtual camera agent (113) uses a configuration file (201) to perform the conversion from a digital camera input (151) to a virtual camera output (153).

The configuration file (201) identifies the digital camera capability (211) that is natively supported by the hardware of the digital camera (131) and the virtual camera capability (213) that is required or requested by the server (107) of VSaaS (125). Based on the configuration file (201), the virtual camera agent (113) determines the optimized way to configure the digital camera (131) for efficient and/or accurate conversion from a digital camera input (151) to a virtual camera output (153).

Optionally, the virtual camera agent (113) can probe (221) the digital camera (131) to obtain responses (223) that are indicative of the hardware capabilities of the digital camera (131) and thus the digital camera capability (211).

For example, a portion of the virtual camera agent (113) can run in the processing device (103) of the digital camera (131) to test hardware settings and options of the digital camera (131). After different settings and options are applied, the digital camera input (151) as received in the virtual camera agent from the digital camera (131) may change. The effect of the hardware settings and options as reflected from the responses (223) from the digital camera (131) can be used to identify the available hardware settings and options in the digital camera (131) and thus the digital camera capability (211).

After the digital camera capability (211) is determined for the configuration file, the virtual camera agent (113) can select an optimized set of settings and options that improves the efficiency and/or accuracy in the conversion from a digital camera input (151) to a virtual camera output (153). After instructing the digital camera (131) to use the optimized set of settings and options, the virtual camera agent (113) can perform the conversion from a digital camera input (151) to a virtual camera output (153) according to the mapping between the digital camera capability (211) and the virtual camera capability (213).

Optionally, the virtual camera agent (113) can receive a camera specification (231) from the server (107) to identify options for the virtual camera capability (213). In some instances, the server (107) allows variations in settings and options in compatible cameras. Thus, the camera specification (231) can be used to identify the virtual camera capability (213) for optimized match with the digital camera capability (211).

Optionally, the server can provide hints (233) to assist the virtual camera agent (113) in probing the digital camera (131) for its digital camera capability (211). For example, the hints can include common options and settings available in different types of digital cameras and common ways used in different types of digital cameras to adjust settings and options. For example, the hints can include various responses to various probing in digital cameras, which can allow the virtual camera agent to identify a digital camera from certain response (223).

Figure 5:
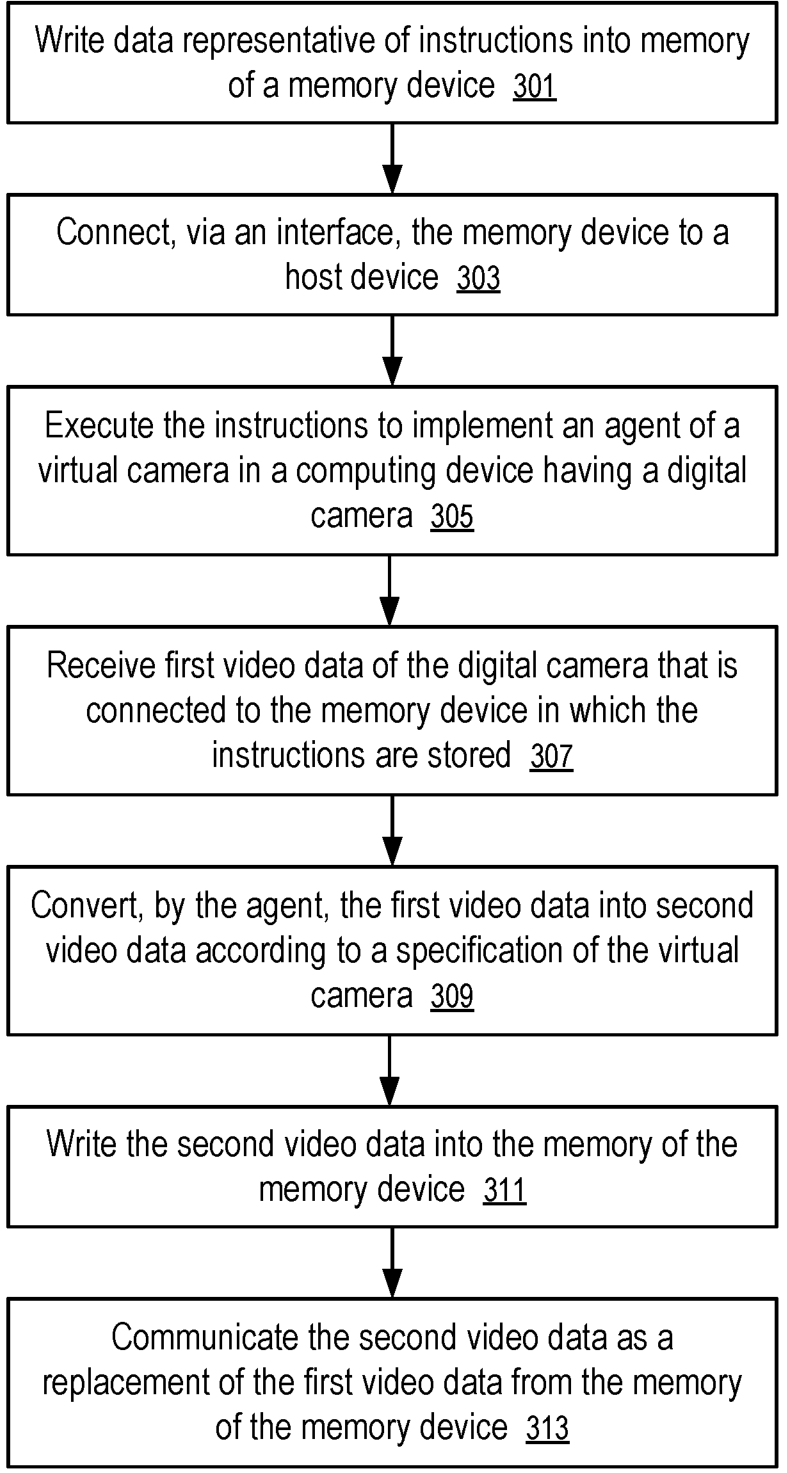
FIG. 5 shows a method of video surveillance as a service according to one embodiment.

FIG. 5 shows a method of video surveillance as a service according to one embodiment. For example, the method of FIG. 5 can be implemented in a system of FIG. 2 with a virtual camera agent (113) configured according to FIG. 3 and/or FIG. 4.

At block 301, data representative of instructions is written into memory of a memory device.

For example, the memory device can be a removable storage device (141) illustrated in FIG. 2, a memory device (121) illustrated in FIG. 1, or a memory sub-system (111) illustrated in FIG. 1. The instructions are configured for a virtual camera agent (113) illustrated in FIGS. 1 to 4.

At block 303, the memory device is connected, via an interface (137), to a host device.

For example, the host device can be, or include, a digital camera (131) illustrated in FIG. 2, or a host system (101) illustrated in FIG. 1.

For example, the memory device is configured with non-volatile memory to store the instructions and to store video data representative of a scene being monitored via a digital camera (e.g., 131). The host system (101) can use the storage capacity of the memory device to buffer and/or store the video data.

For example, the removable storage device (141) can be connected to the host device and/or the digital camera (131) as a secure digital (SD) memory card, a micro SD memory card, a universal serial bus (USB) flash drive, or a solid state drive (SSD).

At block 305, the instructions are executed to implement an agent (e.g., 113) of a virtual camera in a computing device having a digital camera (e.g., 131). The digital camera (131) has hardware capabilities (e.g., image sensor (133), lens (135)) to generate video capturing a scene being monitored.

Optionally, the removable storage device (141) has a processing device configured to execute at least a portion of the instructions stored in the its memory to convert the first video data into the second video data. Alternatively, the agent (e.g., 113) can run in the host device and/or the digital camera (e.g., 131) to convert the first video data into the second video data.

Optionally, at least a portion of the instructions is configured to be executed by the host device or the digital camera (e.g., 131) to probe (221) hardware capability of the digital camera (e.g., 131) and to select mapping from the hardware capability of the digital camera to the camera requirements of the server in configuring the virtual camera.

At block 307, the agent (e.g., 113) receive first video data of the digital camera (e.g., 131) that is connected to the memory device in which the instructions are stored.

At block 309, the agent (e.g., 113) converts the first video data into second video data according to a capability specification of the virtual camera. For example, the capability specification of the virtual camera can be constructed to meet the camera requirements for compatibility with the capability of software of a supervisory server (e.g., 107) that is configured to manage a camera that generates video input for the server (e.g., 107) to provide services, such as video surveillance as a service (VSaaS) (125).

For example, the agent (e.g., 113) can run within the memory device to receive, via the interface (137) the first video data written by the host device or the digital camera (131) to the memory device. In response, the agent (e.g., 113) converts the first video data into the second video data that is representative of a scene shown via the first video data and captured by the virtual camera.

Alternatively, the agent (e.g., 113) can run in the host device or the digital camera (131) to perform the conversion in the path of writing the first video data into the memory device.

At block 311, the agent (e.g., 113) writes the second video data into the memory of the memory device.

For example, the agent (e.g., 113) can write the second video data into the memory as a replacement of the first video data.

At block 313, the second video data is communicated as a replacement of the first video data from the memory of the memory device.

For example, the host device and/or the agent (e.g., 113) can transmit the second video data to a server (107) that is configured to provide video surveillance as a service (VSaaS) (125). The virtual camera is configured according to camera requirements of the server (107) such that the hardware (e.g., image sensor (133), lens (135)) of the digital camera (e.g., 131) does not have to be in compliance with the camera requirements.

For example, the agent (e.g., 113) can be configured to manage communication with the server (107) of video surveillance as a service (VSaaS) (125). The agent (e.g., 113) can convert the first video data from the digital camera (131) just before transmitting the second video data as its replacement to the server (107).

Optionally, the agent (e.g., 113) can secure the second video data using a cryptographic key of the server (107). For example, the key can be used to encrypt the second video data and/or used to verify that the server (107) is authorized to access video data stored in the memory device.

Optionally, the agent (e.g., 113) can use the memory of the memory device to provide edge storage of video data generated by the digital camera (131) for the server (107).

For example, the agent (e.g., 113) can function as an edge server to analyze the second video data and identify a feature recognized from the second video data. Data representative of the feature can be transmitted from the agent (e.g., 113) to the server (107). Based on the feature, the server (107) may decide to retrieve the second video data from the memory device, or to discard the second video data.

Figure 6:
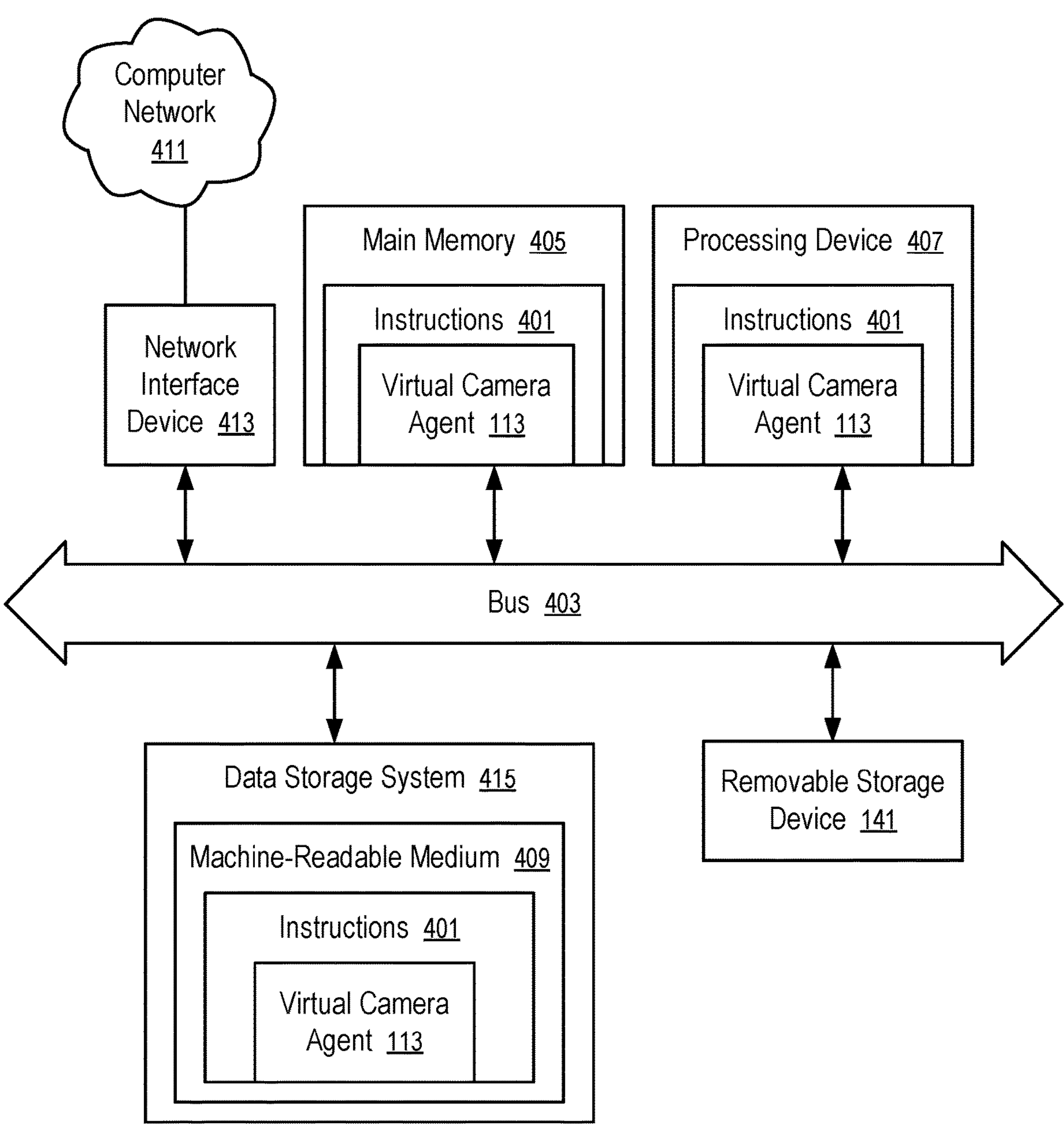
FIG. 6 shows a block diagram of an example computer system in which embodiments of the present disclosure can operate.

FIG. 6 illustrates an example machine of a computer system within which a set of instructions, for causing the machine to perform any one or more of the methodologies discussed herein, can be executed. For example, the methodologies discussed in connection with FIG. 5 can be implemented via the set of instruction.

In some embodiments, the computer system of FIG. 6 can implement a system of FIG. 2 with a virtual camera agent (113) of FIGS. 1, 2, 3 and/or 4.

The computer system of FIG. 6 can be used to perform the operations of a virtual camera agent (113) described with reference to FIGS. 1-5 by executing instructions configured to perform the operations corresponding to the virtual camera agent (113).

In some embodiments, the machine can be connected (e.g., networked) to other machines in a local area network (LAN), an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a personal digital assistant (PDA), a cellular telephone, a surveillance camera, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 6 includes a processing device (407), a main memory (405), and a data storage system (415), which communicate with each other via a bus (403). For example, the processing device (407) can include one or more microprocessors; the main memory (405) can include read-only memory (ROM), flash memory, dynamic random access memory (DRAM), such as synchronous DRAM (SDRAM) or Rambus DRAM (RDRAM), static random access memory (SRAM), etc. The bus (403) can include, or be replaced with, multiple buses.

The processing device (407) in FIG. 6 can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Alternatively, or in combination, the processing device (407) can include one or more special-purpose processing devices such as an application specific integrated circuit (ASIC), a field programmable gate array (FPGA), a digital signal processor (DSP), a network processor, or the like. The processing device (407) is configured to execute instructions (401) for performing the operations discussed in connection with the virtual camera agent (113).

The computer system of FIG. 6 can further include a network interface device (413) to communicate over a computer network (411).

Optionally, the bus (403) is connected to a removable storage device (141) to configure and/or run a virtual camera agent (113).

The data storage system (415) can include a machine-readable medium (409) (also known as a computer-readable medium) on which is stored one or more sets of instructions (401) or software embodying any one or more of the methodologies or functions described herein. The instructions (401) can also reside, completely or at least partially, within the main memory (405) and/or within the processing device (407) during execution thereof by the computer system, the main memory (405) and the processing device (407) also constituting machine-readable storage media.

In one embodiment, the instructions (401) include instructions to implement functionality corresponding to a virtual camera agent (113), such as the virtual camera agent (113) described with reference to FIGS. 1-5. While the machine-readable medium (409) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (universal serial bus) adapter for controlling USB peripherals, and/or an IEEE-1394 bus adapter for controlling IEEE-1394 peripherals.

The memory may include one or more of: ROM (read only memory), volatile RAM (random access memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., compact disk read-only memory (CD ROM), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:

a removable memory device, comprising:

an interface;

a memory configured to store instructions executable at least in part in the removable memory device to function as an agent; and a processing device, wherein in response to a host device writing a first video into the removable memory device through the interface, the processing device is configured to execute the instructions to convert the first video into a second video according to a specification of a virtual camera, and store the second video as a replacement of the first video;

wherein the removable memory device is configured as one of a secure digital memory card, a micro secure digital memory card, a universal serial bus flash drive, or a solid state drive.

2. The computing device of claim 1, further comprising:

a digital camera configured to generate the first video.

3. The computing device of claim 2, wherein the host device includes the digital camera.

4. The computing device of claim 2, wherein the agent is configured to convert the first video into the second video according to a capability of a server configured to manage the digital camera.

5. The computing device of claim 4, wherein the memory is non-volatile.

6. The computing device of claim 1, further comprising:

the host device having a digital camera configured to generate the first video;

wherein the host device is further configured to retrieve the second video from the removable memory device and provide the second video to a server configured to provide video surveillance as a service.

7. The computing device of claim 1, wherein at least a portion of the instructions is configured to be executed by the host device; and wherein the portion of the instructions is configured to probe hardware capability of a digital camera and to select mapping from the hardware capability of the digital camera to camera requirements of a server to configure the virtual camera.

8. A method, comprising:

communicating, via an interface, between a host device and a memory device having memory storing data representative of instructions to execute the instructions implementing an agent, wherein the memory device includes non-volatile memory, wherein the memory device is configured as a secure digital (SD) memory card, a micro SD memory card, a universal serial bus (USB) flash drive, or a solid state drive (SSD);

receiving, via the interface, first video data written by the host device to the memory device;

converting the first video data into second video data representing a scene shown via the first video data and captured by a virtual camera, wherein the virtual camera is configured according to camera requirements of a server;

writing the second video data into the memory of the memory device; and communicating the second video data as a replacement of the first video data from the memory of the memory device;

wherein the host device comprises a digital camera configured to retrieve the second video data from the memory device and provide the second video data to the server configured to provide video surveillance as a service.

9. The method of claim 2, wherein at least a portion of the instructions is executed by a processing device of the memory device to convert the first video data into the second video data.

10. The method of claim 2, wherein at least a portion of the instructions is configured to be executed by the host device to probe hardware capability of the digital camera and to configure hardware settings of the digital camera for mapping to the camera requirements of the server in configuring the virtual camera.

11. A non-transitory computer storage medium storing instructions which, when executed in a computing device, cause the computing device to perform a method, the method comprising:

implementing an agent of a virtual camera in the computing device having a digital camera;

receiving first video data of the digital camera that is connected to a memory device in which instructions are stored;

converting, by the agent, the first video data into second video data; and writing the second video data into memory of the memory device as a replacement of the first video data;

wherein a first portion of the instructions is configured to be executed by the digital camera to probe hardware capability of the digital camera in configuring the virtual camera.

12. The non-transitory computer storage medium of claim 11, wherein the method further comprises:

communicating, by the agent, with a server computer system configured to provide video surveillance as a service; and providing, by the agent, the second video data as an input to the server computer system from the virtual camera.

13. The non-transitory computer storage medium of claim 12, wherein the method further comprises:

securing, by the agent, the second video data using a cryptographic key of the server computer system;

wherein the memory device is configured as a removable data storage device; the memory includes non-volatile memory; and the removable data storage device is configured as a secure digital (SD) memory card, a micro SD memory card, a universal serial bus (USB) flash drive, or a solid state drive (SSD).

14. The non-transitory computer storage medium of claim 13, wherein the method further comprises:

providing, by the agent, edge storage of video data generated by the digital camera for the server computer system.

15. The non-transitory computer storage medium of claim 13, wherein the method further comprises:

providing, by the agent, an edge server to analyze the second video data and identify a feature recognized from the second video data; and transmitting, by the agent, data representative of the feature to the server computer system.

16. The non-transitory computer storage medium of claim 13, wherein a second portion of the instructions is configured to be executed by a processing device of the memory device to convert the first video data into the second video data.

* * * * *